United States Patent
Buechler

[11] Patent Number: 5,439,129
[45] Date of Patent: Aug. 8, 1995

[54] FUEL TANK FILLER PIPE ARRANGEMENT

[75] Inventor: Jeffrey L. Buechler, Hartland, Mich.

[73] Assignee: Borg-Warner Automotive, Inc., Sterling Heights, Mich.

[21] Appl. No.: 271,086

[22] Filed: Jul. 6, 1994

[51] Int. Cl.⁶ .............. B65B 39/04; B65B 31/00; B65B 3/04
[52] U.S. Cl. ............... 220/86.2; 141/44; 141/59; 141/302; 141/312; 137/587
[58] Field of Search .......... 141/44, 45, 46, 59, 141/301, 302, 312, 95; 220/86.2, 89.1; 137/493.4, 493.9, 587, 588

[56] References Cited

U.S. PATENT DOCUMENTS

| | | | |
|---|---|---|---|
| 4,724,861 | 2/1988 | Covert et al. | 137/202 |
| 4,762,247 | 8/1988 | Temmesfeld | 220/303 |
| 4,798,306 | 1/1989 | Giacomazzi et al. | 220/86 |
| 4,813,453 | 3/1989 | Jenkins et al. | 137/588 |
| 4,893,643 | 1/1990 | Gifford et al. | 137/202 |
| 4,966,299 | 10/1990 | Teets et al. | 220/85 |
| 5,027,868 | 7/1991 | Morris et al. | 141/59 |
| 5,040,575 | 8/1991 | Oeffling et al. | 141/44 |
| 5,322,100 | 6/1994 | Buechler. | |

Primary Examiner—J. Casimer Jacyna
Assistant Examiner—Peter S. Hrycko
Attorney, Agent, or Firm—Reising, Ethington et al.; Greg Dziegielewski

[57] ABSTRACT

A fuel filler module fits in the filler pipe of an automotive fuel tank and includes a spring biased trap door assembly that cooperates with a fuel nozzle restrictor to seal an open end of the filler pipe automatically when a fuel nozzle is withdrawn. The trap door assembly includes positive and vacuum pressure relief valves for maintaining fuel tank pressure within certain limits. The fuel filler module also includes a fuel nozzle guide that is part of a vent system for venting the fuel tank during the refuelling process and a splash guard feature that prevents splash back at the end of the refuelling process. The trap door assembly and an internal valve assembly are designed to be handled and installed as a unit to facilitate economical manufacture.

13 Claims, 1 Drawing Sheet

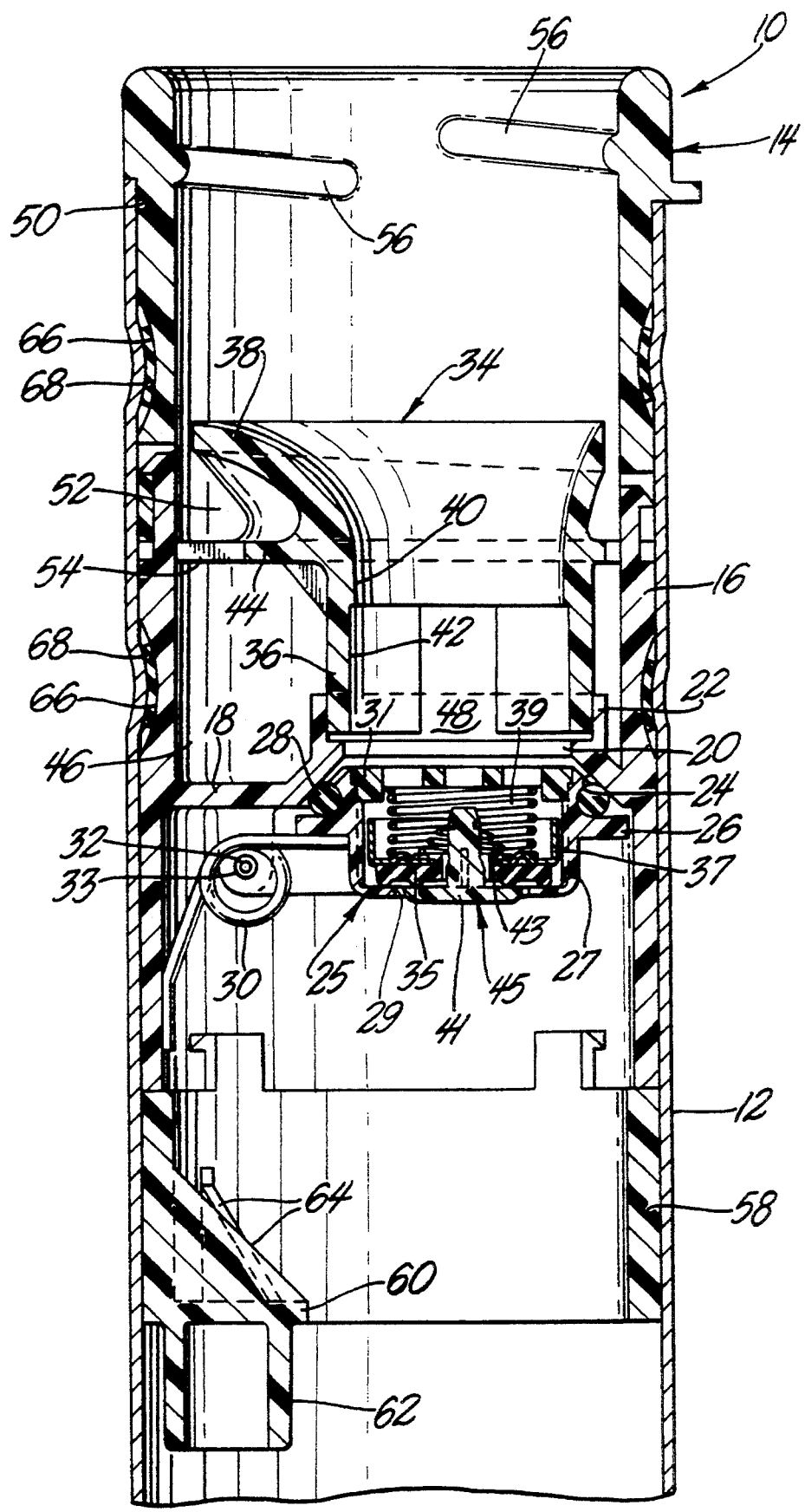

FUEL TANK FILLER PIPE ARRANGEMENT

BACKGROUND OF THE INVENTION

This invention relates to fuel systems and more particularly to a filler pipe arrangement for an automotive fuel tank or the like.

Automotive fuel tanks are refuelled by means of a filler pipe that carries a detachable cap at the open end of the filler pipe. This detachable gas cap is customarily designed to seal the open end of the filler pipe when it is installed. However, there are instances when the gas cap is not installed properly after refuelling or forgotten altogether.

This is an undesirable situation for many reasons particularly for automotive vehicles that have an on-board diagnostic system that requires the filler pipe to be sealed in order to function properly.

My prior U.S. Pat. No. 5,322,100 issued Jun. 21, 1994 provides a fuel filler module for the filler pipe of an automotive fuel tank or the like that has a spring biased trap door that automatically seals the open end of the filler pipe when the fuel nozzle is withdrawn so that filler pipe is sealed even if the gas cap is not installed properly or forgotten after fueling.

While this filler pipe arrangement performs its intended purpose very satisfactorily, there is a further need for maintaining the pressure in the sealed fuel tank within certain limits.

U.S. Pat. No. 4,893,643 granted to William E. Gifford et al Jan. 16, 1990 recognizes that a sealed fuel tank is subject to positive pressure fluctuations due to the vaporization of liquid fuel in the fuel tank expansion of the liquid fuel and fuel vapor due to rising temperature. A positive pressure fluctuation occurs even if the fuel system includes a fuel vapor storage canister such as that disclosed in the Gifford patent. The Gifford filler pipe arrangement therefore incorporates a poppet valve to relieve high fuel tank pressures. The poppet valve, however is located next to the spring biased trap door for sealing the fuel tank thereby increasing the size of the filler pipe arrangement. Moreover, the Gifford filler pipe arrangement does not relieve undesirable negative or vacuum pressure in the sealed fuel tank that can develop due mainly to low temperature and high altitude.

On the other hand fuel caps equipped with positive and vacuum pressure relief valves are known. These fuel caps, however, are not useful in filler pipe arrangements that are sealed internally such as the filler pipe arrangements that are disclosed in my prior U.S. Pat. No. 5,322,100 and the aforementioned U.S. Pat. No. 4,893,643.

SUMMARY OF THE INVENTION

The object of this invention is to provide a compact filler pipe arrangement for a fuel tank that seals the filler pipe internally and relieves undesirable pressure.

A feature of the filler pipe arrangement of the invention is that undesirable vacuum or negative pressures as well as undesirable positive pressures can be relieved.

Another feature of the filler pipe arrangement of the invention is that pressure and vacuum relief valves are incorporated in a spring biased trap door assembly that seals the fuel tank, in a compact and efficient manner.

Another feature of the filler pipe arrangement of the invention is that the pressure and vacuum relief valves are located on the fuel tank or outlet side of the spring biased trap door assembly. This provides several advantages. One advantage is the economic use of available space so as to avoid any need for increasing the size of the filler pipe arrangement. Another advantage is that an existing fuel nozzle restrictor can be used without alteration. Still yet another advantage is that an existing fuel nozzle guide that is part of a vent system for venting the fuel tank during the refuelling process, and/or a splash guard that prevents splash back at the end of the refuelling process, can be used without alteration.

Still another feature of the filler pipe arrangement of the invention is that the pressure and vacuum relief valves are incorporated in a trap door assembly that can be handled and installed as a unit to facilitate manufacture.

Still yet another feature of the filler pipe arrangement of the invention is that the pressure and vacuum relief valves are provided by a few number of parts that can be handled and installed as a unit to reduce complexity and save costs.

BRIEF DESCRIPTION OF THE DRAWINGS

The above and other objects, features and advantages of the invention will become more apparent from the following description taken in conjunction with the accompanying drawing wherein like references refer to like parts and wherein the drawing is a longitudinal section of a fuel tank filler pipe arrangement in accordance with the invention.

DESCRIPTION OF THE INVENTION

Referring now to the drawing, a filler pipe arrangement of the invention is illustrated in the form of a module 10 that is installed in the inlet end of a filler pipe 12 of an automotive fuel tank or the like (not shown).

The fuel filler module 10 has several functions. It limits access to fuel nozzles of a predetermined maximum size, for instance, to insure that leaded gasoline is not used in vehicles that require unleaded gasoline. The fuel filler module 10 vents the fuel tank and prevents splash back during the fuelling process. And finally the fuel filler module 10 seals the inlet end of the filler pipe 12 automatically when the fuel nozzle is withdrawn. Consequently tests that require a sealed inlet, such as those conducted by an onboard evaporative system monitor or other vehicle diagnostic systems can function properly even when the gas cap is not properly installed or missing altogether.

The fuel filler module 10 is a snap-together assembly of four components that are largely molded plastic parts or assemblies of molded plastic parts. The plastic parts are made of acetal copolymer resins or other suitable thermoplastic materials and are designed for easy molding.

The core component is a door housing assembly 14 that comprises a tubular housing 16 that has a partition wall 18 that separates the housing into an inlet side and an outlet side. The partition wall 18 has an aperture 20 that extends through it for receiving and venting around a nozzle of predetermined size. (The aperture 30 may in accordance with well know convention be sized to receive and vent around a fuel filler nozzle of predetermined maximum size, i.e. a fuel nozzle for unleaded gasoline.)

The inlet side of the partition wall 18 has a collar 22 in a surrounding spaced relationship with the aperture 20. The outlet side has a conical valve seat 24 surrounding the aperture 20 which cooperates with a trap door assembly indicated generally at 25. The trap door assembly 25 includes a trap door 26 that is pivotally mounted in the outlet or fuel tank side of the housing 16 by means of a hinge pin arrangement so that the trap door 26 moves between a generally vertical open position (not shown) and a generally horizontal closed position where the trap door 26 is seated on the valve seat 24.

The trap door 26 has a matching conical face for engaging the conical valve seat 24 that is grooved to carry a seal ring 28 that is made of nitrile or other suitable elastomer. The seal ring 28 seals the interface between the conical face and the conical valve seat 24 when the trap door 26 is biased in the closed position by a spring 30 that is mounted in the outlet side of the housing 16.

The hinge pin arrangement for the trap door 26 includes a hinge pin 32 that is disposed in aligned holes in a clevis part of the trap door 26 and in reinforced parts of the housing 16. The holes 33 in the clevis part of the trap door 26 are oversize so the trap door 26 is pivotally mounted in the outlet side of the door housing 16 loosely and consequently the trap door 26 centers itself on the conical valve seat 24 when the trap door 26 is in the closed position.

The trap door assembly 25 incorporates positive and vacuum pressure relief valves for relieving pressure in the fuel tank in excess of desirable limits. More specifically the trap door 26 includes a valve housing 27 in the shape of a depressed cup that is concentrically arranged with the conical face of the trap door 26 that engages the conical valve seat 24 of the partition wall 18. The bottom wall of the cup-shaped valve housing 27 has a concentric outlet 29 that is located on the outlet or fuel tank side of the partition wall 18.

The open upper end of the cup-shaped valve housing 27 has a disk shaped cover 31. The cover 31 is inserted in the open upper end of the valve housing 27 and attached to the trap door 26 by welding or other suitable means that will withstand the forces imposed by the fuel nozzle to open the trap door assembly 25 for refueling. The cover 31 is perforated by a plurality of holes that extend through the cover 31 to provide an inlet for the valve housing 27 so that the perforated cover 31, the valve housing 27 and the outlet 29 provide a passage extending through the trap door 26 for relieving positive and negative pressures in the fuel tank above predetermined limits.

The trap door assembly 25 further includes an annular elastomeric seal disk 35 that cooperates with bottom wall of the valve housing 27 to open and close the outlet 29. The elastomeric seal disk 35 is attached to a spring retainer 37. The spring retainer 37 may be in the form of a sheet metal cup that slides in the valve housing 27 so that the seal disk 35 moves between an open position and a closed position. In the closed position shown in the drawing, an outer circular rib of the seal disk 35 sealingly engages an internal surface of the valve housing 27 outwardly of the outlet 29 to seal the outlet 29 as more fully explained below. In the open position the annular seal disk 35 is displaced upwardly from the closed position shown in the drawing so that a passage is formed between the outer circular rib of the annular seal disk 35 and the internal surface of the valve housing 27 thereby opening the outlet 29. A positive pressure relief spring 39 engages the spring retainer 37 and the cover 31 to bias the seal disk 35 to the closed position shown in the drawing. Spring 39 determines the maximum positive pressure that can be maintained in the fuel tank which is preferably no more than about 60 inches of water, that is about 36.2 psig.

The trap door assembly 25 further includes a flat head plunger 41 having a stem that slides in the central opening of the annular elastomeric seal disk 35 so that the plunger 41 moves between an open position and a closed position. In the closed position shown in the drawing, the flat head of the plunger is sealingly engaged by an inner circular rib on the lower surface of the annular seal disk 35 to seal the central opening of the annular seal disk 35. In the open position, the flat head of the plunger is displaced downwardly from the annular seal disk 35 so that a passage is formed between the flat head and the inner circular rib thereby providing a flow path from the valve housing 27 to the outlet side of the trap door assembly 25 via the central opening of the annular seal disk 35 and outlet 29. The flat head plunger 41 is biased in the closed position by a vacuum pressure relief spring 43 that engages the spring retainer 37 at one end that is attached to the stem of the plunger 41 at the other end by an end coil nested in a groove at the end of the stem. Spring 41 determines the maximum negative or vacuum pressure that can be maintained in the fuel tank which is preferably about 8 inches of water, that is, about −4.8 psig.

It should be noted that the seal disk 35, spring retainer 37, plunger 41 and vacuum relief spring 43 form an assembly 45 that can be handled and installed as a unit for manufacturing convenience and economy. The assembly 45 is simply inserted in the valve housing 37 followed by the pressure relief spring 39 and cover 31. The seal disk 35, spring retainer 37 and pressure relief spring 39 are then retained in valve housing 27 by the attached cover 31 while plunger 41 is retained in assembly with the seal disk 35 and spring retainer 37 by vacuum relief spring 43. Thus the trap door assembly 25 also can be handled as a unit for installation in the door housing assembly 14. When installed, the valve housing 27 protrudes downwardly into unused space below the partition wall 18. This provides a very compact arrangement and permits use of the tubular housing 16 without alteration.

Moreover, the tubular housing 16 and the several plastic parts of the trap door assembly 25 are all configured for easy molding to further facilitate economical manufacture. Furthermore, the positive and vacuum pressure relief valves can be tested and the door housing assembly 14 itself can be leak tested before assembly of the remaining components which further enhances manufacturing economy and efficiency.

The second component is a nozzle guide 34 that is disposed in the inlet side of the housing 16. This nozzle guide 34 can be used without alteration with the trap door assembly 25 because of the location of the valve housing 27 on the outlet or fuel tank side of the partition wall 18. The nozzle guide 34 has a tube 36 at one end that fits in the collar 22 and a bell 38 at the opposite end that leads to an internal throat 40. The throat 40 is sized to fit closely around a fuel nozzle of predetermined size so as to seal around the fuel nozzle as much as possible without requiring any substantial effort to insert the fuel nozzle into the nozzle guide 34 or withdraw it. By way of example, a throat 40 having an inner diameter of 22.0 mm is considered a close fit for a fuel nozzle having a nominal outer diameter of 21.2 mm.

In view of this close fit, the tube 36 of the nozzle guide 34 has a counterbore 42. This counterbore 42 provides an annular vent passage around the fuel nozzle when it is inserted through the aperture 20 of the partition wall 18 via the fuel nozzle guide 34. This forms part of a vent system and splash guard feature that are described in detail below.

The nozzle guide 34 also includes a deflector flange 44 that engages an end of the housing 16 to form an outer annular vent chamber 46. The collar 22 and the tube 36 of the nozzle guide 34 have matching pairs of slots 48 diametrically opposite each other that establish communication between the counterbore 42 and the outer annular vent chamber 46 as shown in the drawing. The nozzle guide 34 is also configured for easy molding.

The third component is a tubular retainer 50 that is attached to the end of the tubular housing 16 with the rim of the deflector flange 44 trapped between the end of the housing 16 and the end of the retainer 50 so as to hold the nozzle guide 34 in place. The housing 16 and the retainer 50 are held together by longitudinal barbed fingers at the end of the housing 16 that engage in slots in the end of the retainer 50. The fingers are resilient enough to permit snap-together assembly of the three components.

When the three components are assembled, the bell 38 of the nozzle guide 34 is disposed in the tubular retainer 50 and it has a periphery in close proximity to an inner surface of the retainer 50 so to form a second annular outer vent chamber 52 between the bell 38 and the deflector flange 44 of the nozzle guide 34. The deflector flange 44 has three parallel slots 54 that establish communication between the first and second outer annular chambers 46 and 52 as shown in FIGS. 1 and 3. The end of the tubular retainer 50 has an internal thread 56 that is used to attach the gas cap (not shown) and as a catch for engaging a retainer spring of the fuel nozzle when it is inserted into the fuel filler assembly 10.

The fourth component is an optional vent tube retainer 58 attached to the opposite end of the housing 16 for those installations that have an internal rather than an external vent tube. The vent tube retainer 58 has a partial lateral wall 60. A slotted vent tube holder 62 is integrally attached to the bottom of the wall 60 for holding the end of a conventional flexible vent tube (not shown). Three circumferentially spaced, generally triangular deflector plates 64 are attached to the top of the wall 60 and the side wall of the retainer 58 as shown in FIGS. 1 and 4. The deflector plates 64 deflect the fuel nozzle away from the vent tube holder 62 when it is inserted through the aperture 20 in the partition wall 18. The vent tube retainer 58 is also configured for easy molding and it is also snap assembled to the housing 16 to facilitate economical manufacture.

The tubular housing 16 and the retainer housing 50 each have a shallow external circumferential groove 66 that holds an elastomeric band 68. The fuel filler module 10 is installed in the filler pipe 12 simply by inserting the module 10 in the filler pipe 12 and crimping the pipe 12 inwardly against the elastomeric bands 68 in the grooves 66 to retain the module 10 in place.

The vent system and splash guard feature which can be retained when the trap door assembly 25 is used, operate as follows. During refuelling the fuel nozzle is inserted into the fuel filler module 10 until the tip extends through the aperture 20 and forces the trap door 26 to a generally vertical open position against the bias of the spring 30. This establishes a vent system for air trapped in the fuel tank that needs to escape as the fuel tank is being filled with gasoline. This vent system comprises a path from the inlet side of the housing 18 to the inner vent chamber formed by the counterbore 42 via the space in the aperture 20 around the fuel nozzle. The path continues to the first outer annular vent chamber 46 via the slots 48 and thence to the second outer annular chamber 52 via the slots 54 and finally out the open end of the module 10 via the space between the rim of the bell 38 and the inner wall of the tubular retainer 50.

When the refuelling nears completion, this same vent system provides a splash guard that prevents fuel splashing out the open end of the module 10 via the space between the fuel nozzle and the nozzle guide 38. As indicated earlier the throat 40 of the nozzle guide 38 has a close fit with the fuel nozzle. This close fit provides a restriction that resists fuel flow. On the other hand, the counterbore 42 and the large slots 48 offer comparatively little fuel flow resistance. Consequently, any surge of fuel that enters the counterbore 42 during the refuelling process flows laterally into the outer annular chamber 46 via the slots 48 rather than up through the space between the throat 40 and the fuel nozzle. The fuel entering the first outer annular chamber 46 does not splash back out the module opening due to the deflector flange 44 which deflects any fuel spray downwardly and channels the fuel into the second outer annular chamber 52. Here again, the fuel entering the second outer annular chamber 52 does not splash back out the module opening due to the bell 38 which deflects any fuel spray laterally and restricts fuel flow past the rim of the of the bell 38 due to the close proximity of the side wall of the retainer housing 50. Fuel nozzles are conventionally equipped with automatic shut-offs that should stop the refuelling process long before any fuel escapes from the second outer annular chamber 52. However, in the event that there is some small fuel escape, this fuel simply flows back down the nozzle guide 34 via the throat 40 when the fuel nozzle shuts off.

After refuelling, the open end of the filler pipe 12 is automatically sealed by closure of the trap door assembly 25 under the bias of the spring 30 when the fuel nozzle is withdrawn from the fuel filler module 10. This seals the fuel tank whereupon the trap door assembly 25 itself relieves undesirable excessive pressures in the fuel tank as follows.

When the positive pressure rises above a predetermined limit, the pressure on the annular elastomeric seal disk 35 raises the seal disk 35 (and plunger 41) against the action of spring 39. This opens outlet 29 to provide a flow path into the valve housing 27 and out through the inlets in the perforated cover 31 to relieve the positive pressure until it is reduced to the point where the force of the spring 39 closes the annular seal disk 35. Note that any positive pressure enhances sealing of the flat head plunger 41 so that the central opening of the annular seal disk 35 is always sealed under positive pressure conditions. On the other hand, when the negative pressure falls below a predetermined limit, the negative pressure on the flat head plunger 41 pulls the flat head of the plunger 41 away from the annular seal disk 35 against the action of spring 43. This establishes a flow path through the trap door assembly 25 via the central opening of the annular seal disk 35, the valve housing 27 and the inlets in the cover 31 to relieve the vacuum pressure until it is reduced to the point where the force of the spring 43 closes the flat head plunger 41 against the annular seal disk 35. Note that any negative pressure enhances sealing of the annular seal disk 35 against the interior surface of the valve housing 27.

Thus the invention provides a compact and efficient filler pipe arrangement that not only seals the filler pipe but also relieves undesirable excessive pressures. This arrangement also eliminates any need for pressure relief valves in the gas or fuel cap so that a fuel cap with a simple vent hole can be used.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A filler pipe arrangement for a fuel tank having a trap door assembly for sealing the filler pipe, the trap door assembly comprising:
   a trap door having a fill side, a tank side and a passage extending through the trap door from the fill side to the tank side and
   a first valve movably mounted in the trap door for closing the passage, the first valve being moveable to an open position in response to a predetermined pressure acting on the tank side of the trap door.

2. The filler pipe arrangement as defined in claim 1 wherein the first valve is moveable to the open position in response to a predetermined positive pressure acting on the tank side of the trap door, and wherein a second valve is movably mounted on the door for closing the passage, the second valve being moveable to an open position in response to a predetermined vacuum pressure acting on the tank side of the trap door.

3. The filler pipe arrangement as defined in claim 2 wherein the first valve comprises an annular seal member that is slidably mounted in the passage that extends through the door for movement between a closed position and an open position and the second valve comprises a plunger that is slidably mounted on the annular seal member for movement between a closed position and an open position.

4. The filler pipe arrangement as defined in claim 2 wherein the first valve comprises a seal member that is slidably mounted in the passage that extends through the trap door for movement between a closed position and an open position.

5. The filler pipe arrangement as defined in claim 3 wherein the second valve comprises a plunger that is slidably mounted on the seal member for movement between a closed position and an open position.

6. A filler pipe arrangement for a fuel tank having a trap door assembly for sealing the filler pipe, the trap door assembly comprising:
   a trap door having means for attaching the trap door assembly so that it swings between an open position and a closed position for sealing the filler pipe,
   the trap door including a valve housing having an outlet at one end,
   a perforated cover attached to the trap door at an opposite end of the valve housing so that a passage extends through the trap door,
   an annular seal member slidably mounted in the valve housing for movement between an open position and a closed position where the seal member closes the outlet of the valve housing,
   a first spring biasing the seal member to the closed position,
   a plunger slidably mounted on the annular seal member for movement between an open position and a closed position where the plunger closes a central opening of the annular seal member, and
   a second spring biasing the plunger to the closed position.

7. The filler pipe arrangement as defined in claim 6 wherein the annular seal member engages an internal surface of the trap door in the closed position.

8. The filler pipe arrangement as defined in claim 6 wherein the plunger engages an external surface of the annular seal member in the closed position.

9. The filler pipe arrangement as defined in claim 6 wherein the annular seal engages an internal surface of the trap door in the closed position and the plunger engages an external surface of the annular seal member in the closed position.

10. The filler pipe arrangement as defined in claim 6 wherein the annular seal includes a cup shaped spring retainer that is engaged by the first and second springs.

11. The filler pipe arrangement as defined in claim 6 wherein the annular seal member, the spring retainer, the plunger, and the second spring form an assembly that is handled and installed as a unit.

12. The filler pipe arrangement as defined in claim 6 wherein the trap door assembly is handled and installed in the filler pipe as a unit.

13. A filler pipe arrangement for a fuel tank having a trap door assembly for sealing the filler pipe,
   the trap door assembly comprising:
   a trap door having a fill side, a tank side and means for attaching the trap door that it swings between an open position and a closed position for sealing the filler pipe,
   the trap door including a valve housing having an outlet at the tank side of the trap door,
   a perforated cover attached to the trap door to provide an inlet to the valve housing at the fill side of the trap door so that a passage extends through the trap door,
   an annular elastomeric disk slidably mounted in the valve housing for movement between an open position and a closed position where the seal disk engages an internal surface of the valve housing to close the outlet,
   a spring retainer cup attached to the annular seal disk for retaining a positive pressure relief spring that biases the seal plate to the closed position,
   a plunger slidably mounted on the annular seal disk for movement between an open position and a closed position where the plunger engages an external surface of the annular seal disk to close a central opening of the annular seal plate, and
   a vacuum pressure relief spring associated with the spring retainer cup for biasing the plunger to the closed position.

* * * * *